Figure 1:
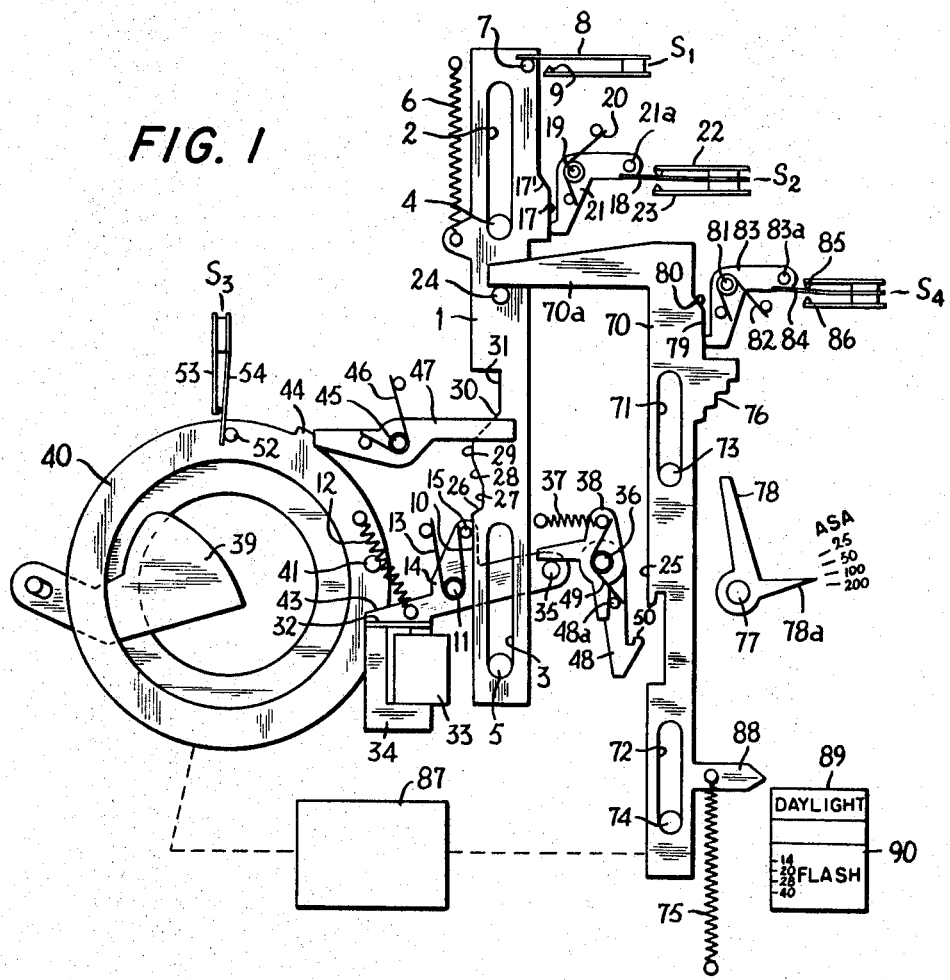

United States Patent [11] 3,535,989

| [72] | Inventor | Kiyoshi Kitai<br>Tokyo, Japan |
|---|---|---|
| [21] | Appl. No. | 704,710 |
| [22] | Filed | Feb. 12, 1968 |
| [45] | Patented | Oct. 27, 1970 |
| [73] | Assignee | Kabushiki Kaisha Hattori Tokeiten<br>Tokyo, Japan |
| [32] | Priority | Feb. 14, 1967 |
| [33] | | Japan |
| [31] | | 42/9057 |

[54] AUTOMATIC FLASH PHOTOGRAPH CHANGE-OVER DEVICE
10 Claims, 2 Drawing Figs.

[52] U.S. Cl. .................................................. 95/10, 95/11.5, 95/53
[51] Int. Cl. ........................................... G03b 7/08, G03b 7/16, G03b 9/58
[50] Field of Search.......................................... 95/10(C), 11.5, 53

[56] References Cited
UNITED STATES PATENTS
3,416,421 12/1968 Biepermann et al. ......... 95/10(C)UX
3,433,138 3/1969 Burgarella ..................... 95/10(C)UX
3,433,144 3/1969 Irvester ......................... 95/10(C)UX

*Primary Examiner*—Norton Ansher
*Assistant Examiner*—Joseph F. Peters, Jr.
*Attorneys*—Robert E. Burns and Emmanuel J. Lobato ABSTRACT: A camera shutter mechanism which senses the brightness of the intended subject before an exposure and automatically selects between a daylight exposure and a flash exposure according to whether the brightness is above or below a selected value. If a daylight exposure is selected, the same sensing means controls the time of the exposure according to the brightness of the subject. If a flash exposure is selected, the exposure is controlled in accordance with a selected guide number and the distance to the subject.

Patented Oct. 27, 1970

3,535,989

AUTOMATIC FLASH PHOTOGRAPH CHANGE-OVER DEVICE

This invention relates to a camera shutter in which a selection between a daylight exposure and a flash exposure is automatically made before the exposure is started according to whether the brightness of a subject is above or below a selected value; and, thereafter, in the event a daylight exposure is selected, the exposure is automatically controlled in response to the subject brightness.

There have been proposed automatic camera shutter mechanisms having an electromagnet controlled by a photosensor for effecting a selection between a daylight exposure and a flash exposure, and a second electromagnet for controlling the time of the exposure in the event a daylight exposure is selected. This arrangement requires various circuit elements for operating the electromagnets, and additional space for accommodating such elements. Consequently, such mechanisms result in greater cost, difficulties in manufacturing and a less compact mechanism.

In accordance with the present invention, a single electromagnet controlled by an electric circuit having a photoelectric element for sensing the brightness of the subject is used both to select between a daylight exposure and a flash exposure, and to control the exposure in accordance with the brightness of the subject in the event a daylight exposure is selected. The same photoelectric element is used to sense the brightness of the subject during an exposure in order to control the exposure time. In the event a flash exposure is selected, the exposure is controlled in accordance with a selected guide number and the distance to the subject. Prior to the beginning of an exposure, the electric circuit controlling the electromagnet functions as a brightness detecting circuit in order to select between a daylight exposure and a flash exposure. The circuit is then changed over to a time delay circuit. If a daylight exposure has been selected, the time delay circuit provides an exposure time according to the brightness of the subject. If a flash exposure has been selected, the time delay circuit provides a set time for the exposure while the aperture is controlled in accordance with the selected guide number and the distance to the subject.

Figure 2:
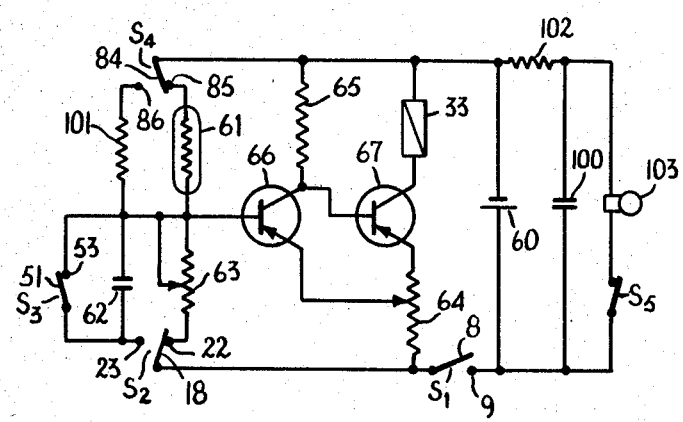

The invention together with its features and advantages will be more fully understood from the following description of a preferred embodiment shown by way of example in the drawings in which:

FIG. 1 is a schematic view of essential portions of an automatic shutter mechanism in accordance with the invention; and FIG. 2 is a schematic diagram of the electric circuit of the shutter mechanism shown in FIG. 1.

With reference to FIG. 1, the shutter mechanism comprises a release lever 1 which is guided for movement upwardly and downwardly by pins 4 and 5 which are mounted on a suitable support and are slidably received in guide grooves 2 and 3 of the release lever. A tension spring 6 having one end attached to the release lever 1 and the other end attached to a suitable support biases the release lever to its upper position as shown in FIG. 1. In this position, a pin 7 on the release lever engages a contact piece 8 of a power source switch S1 so as to disconnect it from the contact 9 and thereby hold the switch in open position. A side face 17 of the release lever 1 engages a switch lever 21 of a changeover switch S2 which is pivotally mounted on a shaft 19 and is biased to turn in a clockwise direction by a spring 20. A contact piece 18 of the changeover switch S2 is normally biased so as to engage a contact 22 and is engageable by a pin 21a on the switch lever 21 to disengage it from contact 22 and bring it into engagement with contact 23 when the switch lever 21 is rotated in a clockwise direction by its spring 20. When the release lever 1 is in its upper position as shown in FIG. 1, the side face 17 holds the switch lever 21 in a counterclockwise position and hence the contact piece 18 of the changeover switch S2 is in engagement with contact 22.

A contoured side face 10, 26, 27, 28, 29, 30 and 31 of the release lever 1 is engageable with a pin 15 of a closing lever 14 which is pivoted on a shaft 11 and is biased to turn in a clockwise direction by springs 12 and 13. When the release lever 1 is in its upper position, the closing lever 14 is held in open position by engagement of pin 15 with the side edge 10 of the release lever 1 as shown in FIG. 1. The closing lever 14 carries a magnetic armature 32 of an electromagnet 33 having an iron core 34. When the electromagnet is energized, the closing lever 14 is held in open position as illustrated in FIG. 1 by attraction of the armature 32 to the iron core 34. When the release lever 1 is moved downwardly, side faces 26, 27, 30 and 31 of the release lever permit the closing lever 14 to be turned in a clockwise direction by its springs 12 and 13 providing the closing lever is not retained in open position by the electromagnet 33. An intermediate side edge portion 29 of the release lever 1 is engageable with pin 15 to position the closing lever in open position.

Shutter blades 39 (of which only one is shown) are operable by a ring 40 which is rotatable in a clockwise direction by the spring 12 to open the shutter blades and is rotatable in a counterclockwise direction to close the shutter by engagement of a side face 43 of the closing lever 14 with a pin 41 on the ring when the closing lever rotates in a clockwise direction from the position shown in FIG. 1. Prior to an exposure, the shutter operating ring 40 is held in closed position by engagement of a projection 44 on the ring with a detent member 47 which is pivotally mounted on a shaft 45 and biased to turn in a counterclockwise direction by a spring 46. At a predetermined point in the downward movement of the release lever 1, the detent member 47 is engaged by a pin 24 on the release lever to disengage it from the projection 44 and thereby permit rotation of ring 40 in a clockwise direction by spring 12 to open the shutter. A pin 52 on the ring 40 presses a contact piece 51 of a timing switch S3 into engagement with a contact 53 to close the switch when the shutter is in closed position.

A guide number selecting member 70 is guided for movement upwardly and downwardly by pins 73 and 74 slidably engaging guide grooves 71 and 72. A tension spring 75 acts downwardly on the selecting member 70 so as to hold an arm 70a of the release member in engagement with the pin 24 of the release lever 1 so that the selecting member follows downward movement of the release lever unless otherwise restrained. When a daylight exposure is to be made as determined by the electric circuit which will be described below, downward movement of the selecting member 70 is interrupted by the engagement of a hook portion 50 of a locking lever 48 with an engaging part 25 on the guide number selecting member 70. The locking lever 48 is pivotally mounted on a shaft 36 and is actuatable by a middle lever 38 which is coaxially pivoted on the shaft 36 and is engageable with a pin 48a on the locking lever. A spring 49 acts on the pin 48a of the locking lever 48 to hold it normally in engagement with the middle lever 38. The middle lever 38 is biased by a spring 37 to turn in a counterclockwise direction so as to move the hook portion 50 of the locking lever 48 into the path of the engaging portion 25 of the selecting member 70. When the closing lever 14 is in open position as shown in FIG. 1, a pin 35 on the closing lever engages an arm of the middle lever 38 so as to rotate the middle lever 38 and locking lever 48 against the action of spring 37 so as to position the hook portion 50 of the locking lever out of the path of movement of the selecting member.

A side face 79 on the selecting member 70 engages the switch lever 83 of a changeover switch S4 having a contact piece 84 which is normally in engagement with a contact 85. The switch lever 83 is pivoted on a shaft 81 and is biased to turn in a clockwise direction by a spring 82. When the selecting member 70 moves downwardly a predetermined distance, a step 80 in the side face of the selecting member permits rotation of the switch lever 83 in a clockwise direction whereupon a pin 83a carried by the switch lever engages the contact piece 84 so as to disengage it from contact 85 and bring it into engagement with a second contact 86 of the changeover switch S4.

When a flash exposure is to be made, the locking lever 48 is held in inoperative position by the closing lever 14 acting through the middle lever 38 until engaging part 25 has passed the hook portion 50 so as to permit continued downward movement of the selecting member 70 with the release lever 1 until one or another of the steps of a stepped face 76 on the selecting member engages one end of a setting lever 78 which is adjustable about a pivot 77 and has a pointer 78a cooperating with a scale indicating the sensitivity of the film being used. An index shown in the form of a pointer 88 cooperates with indicia 89 and 90 to indicate whether a daylight exposure or a flash exposure has been selected by the mechanism and associated electric circuit and further indicating the guide number selected in the event of a flash exposure. Means 87 provided between the guide number selecting member 70 and the shutter control ring 40 includes known mechanism for setting the exposure aperture according to the selected guide number and the distance setting of the camera according to the distance from the subject.

The electric circuit cooperating with the mechanism of FIG. 1 is shown in FIG. 2 in which identical parts have been indicated by the same reference numerals as in FIG. 1. The circuit is shown as comprising a power source 60, a photoresistor 61, condensers 62 and 100, variable resistances 63 and 64, fixed resistances 65, 101 and 102, transistors 66 and 67, the electromagnet coil 33, power source switch S1, changeover switch S2 timing switch S3, changeover switch S4, a synchro switch S5 and a flash illumination device 103. The transistors 66 and 67 with associated components comprise a modified Schmidt multivibrator so that when one of the transistors is conductive, the other becomes nonconductive. The changeover from one transistor to the other occurs very rapidly. The electromagnet coil 33 is connected in the collector circuit of the transistor 67 so that the electromagnet is energized when transistor 67 is conducting. The positions of the switches shown in FIG. 2 correspond to the condition of the mechanism as illustrated in FIG. 1.

When the release lever 1 (FIG. 1) has been moved down a slight amount so as to close the power switch S1 while the other switches remain in the positions shown in FIG. 1 and FIG. 2, the timing condenser 62 is disconnected by switches S2 and S4 and the circuit functions as a circuit for detecting the brightness of a subject to determine whether a daylight exposure or a flash exposure should be used. Whether the transistor 66 is conducting or nonconducting is determined by the base voltage and the emitter voltage of the transistor as determined by the setting of variable resistance 64 and the ratio of the resistance of the photoresistive element 61 with that of the variable resistance 63 which has been set in accordance with the selected brightness required for a daylight exposure. If the values are such that transistor 66 conducts, the transistor 67 will be nonconducting and hence the electromagnet coil 33 will not be energized.

When the contact piece 18 of the changeover switch S2 is connected to contact 23, the variable resistance 63 is disconnected and the condenser 62 is connected in circuit with the photoresistor 61 so as to form a delay circuit. As the timing switch S3 is closed so as to short circuit the condenser 62, the transistor 66 is reverse biased and the transistor 67 is forward biased so that a current will flow in the electromagnet coil 33. When the timing switch S3 opens, as occurs when the projection 44 on ring 40 is released by the detent 47 to start an exposure, the condenser 62 begins to charge. After a period of time determined by the capacity of the condenser 62 and the resistance of the photoresistor 61 according to the brightness of the subject, the transistor 66 is forward biased so as to become conductive while the transistor 67 is reverse biased and becomes nonconductive so that the electromagnet coil 33 is deenergized.

When the contact piece 18 of changeover switch S2 is connected to contact 23 and contact piece 84 of changeover switch S4 is connected to contact 86, the photoresistor 61 is disconnected and the fixed resistance 101 is substituted for it in the timing circuit to provide an exposure time of predetermined length for flash photography. In this event, the synchro contact S5 will be closed in accordance with rotation of the ring 40 so as to connect the flash device 103 to a condenser 100 charged through a fixed resistance 102 to illuminate the flash device.

OPERATION

In operation, the release lever 1 is moved progressively downwardly from the position shown in FIG. 1. In a first increment of movement, the pin 7 on the release lever 1 permits the contact piece 8 of the power source switch S1 to move downwardly into engagement with the contact 9 so as to close the switch and thereby supply power to the transistor circuit. In a first stage of operation before any exposure is started, the electric circuit operates as a detecting circuit to sense the brightness of the subject to be photographed and determine whether the exposure should be a daylight exposure taken with ambient light or a flash exposure. By reason of the tension of spring 75, the arm 70a of the selecting member 70 is kept in contact with pin 24 on the release lever 1 so that the selecting member moves downwardly with the release lever unless restrained by other means. The brightness of the subject is sensed by the photoresistor 61 the resulting resistance of which affects the bias on the transistor 66. If the brightness of the subject is greater than a predetermined value, the transistor 66 is forward biased so as to be conducting whereupon transistor 67 is nonconducting so that no current will flow in the electromagnet coil 33. When the brightness of the subject is less than the selected value, the transistor 66 is reverse biased so as to be nonconducting whereupon transistor 67 is conducting and supplies current to the electromagnet. As the release lever 1 continues to move downwardly, the pin 15 on the closing lever 14 comes to the step 26 in the side face of the release lever so as to permit clockwise rotation of the closing lever by springs 12 and 13. However, if the electromagnet 33 is energized, its attraction of the armature 32 holds the closing lever against rotation. Hence, if the brightness of the subject is less than the selected value, current is supplied to the electromagnet coil 33 so that the closing lever 14, middle lever 38 and locking lever 48 are retained in the position shown in FIG. 1. The hook portion 50 of the locking lever is thereby held out of the path of the engaging portion 25 of the selecting member to permit continued downward movement of the selecting member with the release lever 1 so as to provide for a flash exposure. If on the other hand the brightness of the subject is greater than the selected value, the electromagnet 33 is deenergized and closing lever 14 is turned about its pivot in a clockwise direction by springs 12 and 13 and permits the middle lever 38 to be turned in a counterclockwise direction by its spring 37 so as to swing the locking lever 48 into a position in which the hook portion 50 is in the path of movement of the engaging portion 25 of the selecting member 70. Downward movement of the selecting member is thereby stopped when the engaging portion 25 reaches the hook portion 50 of the locking lever 48. The selecting member is thereby held in a position for a daylight exposure. Even though the closing lever 14 and middle lever 38 are thereafter returned to the position shown in FIG. 1, the locking lever 48 will be retained in locking position by interengagement of the hook portion 50 with the engaging portion 25 of the selecting member.

When the brightness of the subject is less than a selected value so that a flash exposure is required, the locking lever 48 is retained in the retracted position shown in FIG. 1 as previously described until the engaging portion 25 passes the hook portion 50 so that the selecting member 70 continues to move downwardly with the release lever 1. As the release lever 1 and selecting member 70 continue to move downwardly, the switch lever 21 of changeover switch S2 rides off step 17' of side face 17 so as to disconnect the contact piece 18 from contact 22 and connect it with contact 23. Similarly the switch lever 83 rides off of the side face 79 of the selecting member 70 so that the contact piece 84 of the changeover switch S4 is disconnected from contact 85 and connected with contact 86. There is thus provided a time delay circuit comprising the condenser 62 and fixed resistance 101. The selecting member 70 continues to move downwardly with the release lever 1 until one of the steps of the stepped surface 76 engages the end of the setting lever 78 which has been manually adjusted about its pivot 77 so as to engage a selected step according to the speed of the film being used. The selecting member 70 is thereby stopped in a position depending on film speed. Its position can be read in terms of guide number value by the pointer 88 in cooperation with the scale 90. The device 87 selects the proper aperture setting according to the position of the selecting member 70 and the distance to the subject on which the camera is focused.

As the release lever 1 moves downwardly, the pin 15 on the closing lever 14 is engaged by side face 29 so as to position the closing lever 14 in open position regardless of whether or not the electromagnet 33 is energized. Upon further downward movement of the release lever 1, recessed portions 30 and 31 of the side face permit clockwise pivotal movement of the closing lever 14. However, since the timing switch S3 is closed and short circuits the condenser 62, the transistor 66 is reverse biased so as to be nonconducting and the transistor 67 is forward biased so as to be conducting and supply current to the electromagnet coil 33. The closing lever 14 is thereby retained in its open position by the electromagnet. Upon further downward movement of the release lever 1, the pin 24 engages the detent member 47 so as to pivot it in a clockwise direction and thereby release it from the projection 44 of the shutter operating ring 40. The ring 40 is thereupon rotated in a clockwise direction by the spring 12 to open the shutter and thereby begin an exposure. The synchro switch S5 (not shown in FIG. 1) is thereupon closed to illuminate the flash device 103. Upon rotation of the ring 40 to the right, the pin permits the timing switch S3 to open. The condenser 62 is hence no longer shorted and proceeds to charge through the fixed resistance 101. When the terminal voltage of the condenser 62 reaches a sufficient voltage to provide a forward bias for the transistor 66, that transistor becomes conductive and transistor 67 is cut off so as to deenergize the electromagnet 33 and thereby permit rotation of the closing lever 14 in a clockwise direction. The side face 43 of the closing lever 14 engages pin 41 on the ring 40 to rotate the ring in a counterclockwise direction and thereby close the shutter to terminate the exposure. The exposure having been completed, the release lever 1 is permitted to move upwardly under tension of the spring 6 whereupon the mechanism returns to the initial state shown in FIG. 1.

When the brightness of the subject to be photographed is greater than a predetermined level, the selecting member 70 moves downwardly with the release lever 1 only until it is stopped by the locking lever 48 as described above. In this position, the index 88 on the selecting member 70 cooperates with the indicia 89 to indicate a daylight exposure. As the release lever 1 continues to move downwardly, the switch lever 21 is actuated as described above to shift the contact piece 18 of changeover switch S2 from engagement with contact 22 into engagement with contact 23. However, since downward movement of the selecting member 70 has been halted, the changeover switch S4 remains in the position shown in FIG. 1 with the contact piece engaging contact 85. There is thus formed a timing circuit comprising the condenser 62 and photoresistor 61. As the release lever 1 is moved downwardly, side faces 28 and 29 engage pin 15 of the closing lever 14 so as to return the closing lever 14 and the middle lever 38 to their initial positions. However, the locking lever 48 remains in engagement with the selecting member 70 to prevent its downward movement. Upon further downward movement of the release lever 1, and exposure is effected in the same manner as described for a flash exposure except that the flash device is not actuated and the time delay is varied in accordance with the brightness of the subject since the charging time of the condenser 62 depends on the resistance of the photosensitive element 61 and hence on the brightness of the subject. Upon completion of the exposure, the release lever 1 is permitted to move upwardly under the action of spring 6 and the mechanism is restored to its initial condition.

While a preferred embodiment of the invention has been illustrated in the drawings and particularly described, it will be understood that various modifications may be made. For example, the action of the spring 6 on the release lever 1 may be reversed so that the release lever is moved to its upper limit position against the action of the spring in a winding operation and held in such position by suitable detent or trigger. In order to take a picture, the release lever is released so as to be moved downwardly by the spring 6 with suitable speed control. The stroke required for release operation of the camera is thereby reduced. Moreover, the guide number selecting member may be replaced simply by member for indicating the brightness of a subject.

In accordance with the present invention, it is possible to make daylight exposures or flash exposures automatically in accordance with the brightness of a subject with a minimum number of parts with consequently greater precision and fidelity in operation and lower manufacturing costs. The invention thus represents an important advance in the art.

I claim:

1. In combination with a camera shutter, operating means for opening and closing the shutter to make an exposure, electric circuit means including means for sensing the brightness of a selected subject prior to the opening of the shutter for an exposure, selecting means responsive to said sensing means to select between a flash exposure and an ambient light exposure according to the brightness of the subject, means for regulating the exposure according to a selected guide number in the event a flash exposure is selected by said selecting means, and means responsive to said sensing means for regulating the exposure according to the brightness of the subject in the event an ambient light exposure is selected.

2. In combination with a camera shutter, operating means for opening and closing the shutter to make an exposure, electric circuit means including means for sensing the brightness of a selected subject prior to the opening of the shutter for an exposure, selecting means responsive to said sensing means to select between a flash exposure and an ambient light exposure, said operating means including an electromagnet controlled by said electric circuit means for operation of said shutter to regulate the exposure when an ambient light exposure is selected, said selecting means including means actuated by said electromagnet under control of said electric circuit in accordance with the brightness of the selected subject, and means for regulating the exposure according to a selected guide number in the event a flash exposure is selected by said selecting means.

3. A camera shutter combination according to claim 2, in which said operating means includes a release lever, and a closing lever controlled by said release lever and said electromagnet, and in which said selecting means includes a selection member biased to move with said release lever when not restrained and means controlled by said electromagnet for restraining said selection member when the brightness of the subject is above a selected value.

4. A camera shutter combination according to claim 3, in which said means for restraining said selection member comprises a locking lever engageable in operative position with said selection member, means for biasing said locking lever to operative position and means interconnecting said locking lever with said closing lever to said locking lever in inoperative position when the brightness of the subject is below a selected value.

5. In combination with a camera shutter, operating means for opening and closing the shutter including an electromagnet controlling the closing of the shutter, selecting means controlled by said electromagnet for selecting between a flash exposure and an ambient light exposure, an electric control circuit including current control means for supplying current to said electromagnet, photoresistive means for sensing the brightness of a subject to be photographed, a timing circuit including a capacitance and switching means for connecting said photoresistive means with said current control means prior to an exposure to control the supply of current to said electromagnet and thereby control the functioning of said selecting means to select flash exposure if the brightness of the subject is below a selected value and to select an ambient light exposure if the brightness of the subject is above said selected value, and for thereafter connecting said photoresistive means in said timing circuit in the event an ambient light exposure is selected to control the supply of current to said electromagnet and thereby time the length of an exposure in accordance with the brightness of the subject.

6. A camera shutter combination according to claim 5, in which said circuit further includes a set resistance and means for connecting said resistance in said timing circuit in lieu of said photoresistive means in the event a flash exposure is selected to control the supply of current to said electromagnet and thereby provide an exposure of set time.

7. In combination with a camera shutter, operating means for opening and closing the shutter to make an exposure comprising a release lever having a cam surface, a shutter closing lever biased to follow said cam surface, an electromagnet acting on said closing lever to retain it in open position against said bias when said electromagnet is energized, a selection member for selecting between flash and ambient light exposure biased to follow said release lever, a locking lever biased to active position to engage said selection member at a selected point in its travel and thereby retain said selection member ambient light exposure position against further movement with said release lever, means for holding said locking lever in inactive position when said electromagnet is energized and an electric circuit including photosensitive means for sensing the brightness of a subject to be photographed, means for controlling the supply of current to said electromagnet and switching means including means for connecting said photosensitive means with said current controlling means prior to an exposure to supply current to said electromagnet and thereby release said locking lever to retain said selection member in ambient light exposure position when the brightness of the subject is above a selected value.

8. A camera shutter combination according to claim 7, in which said photosensitive means comprises a photoresistor the resistance of which changes in accordance with the brightness of said subject, and in which said electric circuit includes a capacitance, a set resistance and switch means actuated by said selection member for connecting said photoresistor with said capacitance to form a timing circuit controlling the exposure time in accordance with the brightness of the subject when said selection member is retained in an ambient light exposure position by said locking lever, and for connecting said set resistance with said capacitance to form a timing circuit providing a set exposure time when said selection member is not retained by said locking lever and moves to a flash exposure position.

9. A camera shutter combination according to claim 8, in which comprising guide number selection means for positioning said selection member in a position according to a selected guide number when said selection member is not retained by said locking lever.

10. A camera shutter combination according to claim 7, in which an armature on said closing lever is attracted by said electromagnet when energized to hold said closing lever in open position.